US012769661B2

(12) United States Patent
Fishel et al.

(10) Patent No.: US 12,769,661 B2
(45) Date of Patent: Oct. 20, 2026

(54) FAR MEMORY TELEMETRY FOR HOT AND COLD PAGE MANAGEMENT

(71) Applicant: Google LLC, Mountain View, CA (US)

(72) Inventors: Liran Fishel, Ra'Anana (IL); David Dayan, Kfar Vitkin (IL); Yiftach Benjamini, Givat Elah (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/636,879

(22) Filed: Apr. 16, 2024

(65) Prior Publication Data

US 2025/0321891 A1 Oct. 16, 2025

(51) Int. Cl.
*G06F 12/0817* (2016.01)
*G06F 12/02* (2006.01)
*G06F 12/0882* (2016.01)

(52) U.S. Cl.
CPC ...... *G06F 12/0817* (2013.01); *G06F 12/0246* (2013.01); *G06F 12/0882* (2013.01)

(58) Field of Classification Search
None
See application file for complete search history.

(56) References Cited

U.S. PATENT DOCUMENTS 6,026,472 A * 2/2000 James ................ G06F 12/0813 709/216
9,734,079 B2 8/2017 Feekes et al.
9,830,262 B2 11/2017 Duluk, Jr. et al.
9,921,961 B2 3/2018 Wilkerson et al.
10,901,894 B2 * 1/2021 John .................. G06F 12/0864
11,526,290 B2 * 12/2022 Koufaty ............... G06F 3/0607
11,531,617 B2 12/2022 John et al.
2014/0115297 A1 * 4/2014 Cain, III ............ G06F 12/1027 711/207
2014/0281110 A1 * 9/2014 Duluk, Jr. ............ G06F 12/123 711/135
2015/0052327 A1 * 2/2015 Ancajas ............... G06F 3/0638 711/165
2018/0081541 A1 3/2018 Uppal et al.
(Continued)

OTHER PUBLICATIONS

Extended European Search Report for European Patent Application No. 25170926.7 dated Jul. 29, 2025. 8 pages.
(Continued)

*Primary Examiner* — Yaima Rigol
(74) *Attorney, Agent, or Firm* — Lerner David LLP

(57) ABSTRACT

Aspects of the disclosed technology include techniques and mechanisms for using far memory telemetry for hot and cold page management. A processor within a telemetry system parses page access requests transmitted from a central processing unit (CPU) to a computing system. The processor parses the request to determine whether a directory contains a record for the requested page. Based on determining the directory does not store a record for the requested page and based on determining the directory is not at capacity, the processor generates a record and stores the record in the directory. The processor transmits a signal to the computing system to determine whether to perform one or more actions on the pages identified in the directory, such as move a page from a far memory device to a near memory device based on directory data indicating a number of access requests associated with each page.

17 Claims, 6 Drawing Sheets

(56) References Cited

U.S. PATENT DOCUMENTS

| | | | | |
|---|---|---|---|---|
| 2018/0088853 | A1* | 3/2018 | Kotra | G06F 12/0842 |
| 2021/0019069 | A1 | 1/2021 | Sen et al. | |
| 2021/0303477 | A1* | 9/2021 | Doshi | G06F 12/109 |
| 2021/0405913 | A1* | 12/2021 | Stonelake | G06F 11/3037 |
| 2022/0179799 | A1* | 6/2022 | Erickson | G06F 12/0882 |
| 2023/0044342 | A1* | 2/2023 | Wilkinson | G06F 12/0882 |
| 2024/0069801 | A1 | 2/2024 | Brewer et al. | |
| 2024/0070072 | A1* | 2/2024 | Roberts | G06F 12/0815 |
| 2024/0134803 | A1* | 4/2024 | Kumar | G06F 12/1009 |
| 2025/0208996 | A1* | 6/2025 | Jin | G06F 13/161 |

OTHER PUBLICATIONS

Sha et al. Hardware-software Collaborative Tiered-memory Management Framework for Virtualization. ACM Transactions on Computer Systems (TOCS), Association for Computing Machinery, Inc, US, Jan. 15, 2024 (Jan. 15, 2024), DOI: 10.1145/3639564, 32 pages.
Office Action for European Patent Application No. 25170926.7 dated Aug. 11, 2026. 7 pages.

* cited by examiner

170

| | Memory Address | Subset of Bits for Page Identification | Page Size | Access Count |
|---|---|---|---|---|
| 1 | | | | |
| 2 | | | | |
| 3 | | | | |
| . . . | | | | |
| N | | | | |

Directory Capacity: N

FIG. 2

FAR MEMORY TELEMETRY FOR HOT AND COLD PAGE MANAGEMENT

BACKGROUND

A System on a Chip (SoC) may include a memory device that is formed as part of the SoC or located close to the SoC. Such a memory device is typically called near memory. Near memory is often a faster memory type, such as random access memory (RAM), that reduces the chance for latency in reading/writing operations. However, RAM tends to be more expensive than other memory types and the amount of near memory that can be used is often limited by the physical size of the SoC.

To increase the amount of storage space that is available to the SoC, an additional memory device may be connected to the SoC. This additional memory device is often referred to as far memory since it is typically positioned at location away from the SoC. As far memory is positioned away from the SoC, the amount of far memory is not typically limited by the physical size of the SoC and is often formed by cheaper, slower memory. Thus, far memory typically has more storage capacity than near memory. However, far memory often increases memory access latency due to its slower speed and greater distance from the SoC. Thus, read/write operations may be slower when done from/to far memory than compared to read/write operations from/to near memory.

SUMMARY

Aspects of the disclosed technology include methods, apparatuses, systems, and computer-readable media for using far memory telemetry for hot and cold page management. A computing device or a component thereof, such as a system on a chip (SoC), uses telemetry logic to determine whether to move frequently accessed pages from a memory device outside of the SoC (referred to herein as far memory) to a memory device within the SoC (referred to herein as near memory). Moving pages from the memory device outside of the SoC to the memory device within the SoC may reduce latency associated with executing read/write transactions on the pages stored in the far memory.

One aspect of the disclosure provides for a system for managing pages in memory, the system comprising: one or more computing processors having near memory; far memory coupled to the one or more computing processors; and one or more telemetry processors, wherein the one or more telemetry processors are configured to: parse a page access request provided by a first computing processor of the one or more computing processors; query a directory to determine whether the directory contains a record associated with the requested page; after determining the directory contains the record associated with the requested page, increment an access count associated with the requested page; or after determining the directory does not contain the record associated with the requested page, add the record to the directory.

In the foregoing instance, the one or more telemetry processors are further configured to transmit a signal to the first computing processor indicating the access count associated with the requested page has been incremented.

In any one of the foregoing instances, the one or more telemetry processors are further configured to transmit a signal to the first computing processor indicating the record associated with the requested page has been added to the directory.

In any one of the foregoing instances, parsing the page access request further causes the one or more telemetry processors to: identify a memory address associated with the requested page; identify a page size of the requested page; reduce the memory address into upper bits and lower bits based on the page size, wherein the lower bits are offset bits; and remove the offset bits from the memory address to generate a subset of bits that identify the requested page.

In any one of the foregoing instances, querying the directory causes the one or more telemetry processors to query the directory for the requested page using the subset of bits that identify the requested page.

In any one of the foregoing instances, the directory includes a directory table comprising at least one of: a memory address of each page for which the page access request is parsed; for each page, a subset of bits of the memory address that identifies the page; for each page, a page size; or for each page, an access count.

In any one of the foregoing instances, the access count indicates a number of times a request to access the page is parsed.

In any one of the foregoing instances, the one or more telemetry processors are further configured to discard the page access request based on determining the directory does not contain the record associated with the requested page.

In any one of the foregoing instances, the one or more telemetry processors are further configured to discard the page access request based on determining the directory is at capacity.

In any one of the foregoing instances, the one or more telemetry processors are further configured to add the record associated with the requested page to the directory based on determining the directory is not at capacity.

In any one of the foregoing instances, the one or more telemetry processors are further configured to maintain the directory as a bitmap.

In any one of the foregoing instances, the bitmap identifies one or more pages for which an access count exceeds an access threshold.

In any one of the foregoing instances, the access count indicates a number of times the one or more telemetry processors receives the page access request to access the requested page; and the access threshold indicates a number of page access requests needed to move the requested page from the far memory to the near memory.

In any one of the foregoing instances, each bit of the bitmap corresponds to a different page stored in the far memory.

In any one of the foregoing instances, a state of a bit indicates whether the access count for the requested page exceeds the access threshold for the requested page.

In any one of the foregoing instances, a number of bits on the bitmap is based on a capacity of the directory.

In any one of the foregoing instances, the one or more telemetry processors are further configured to maintain the directory as a list.

In any one of the foregoing instances, the list comprises most requested pages stored in the far memory.

In any one of the foregoing instances, a number of pages comprising the list is based on a capacity of the directory.

In any one of the foregoing instances, the first computing processor is configured to: identify pages in the directory for which an access count exceeds an access threshold; and move the identified pages from the far memory to the near memory.

BRIEF DESCRIPTION OF THE DRAWINGS

FIG. 2 illustrates an example directory storing a table used for far memory telemetry for hot and cold page management, in accordance with aspects of the disclosure.

DETAILED DESCRIPTION

Figure 1A:
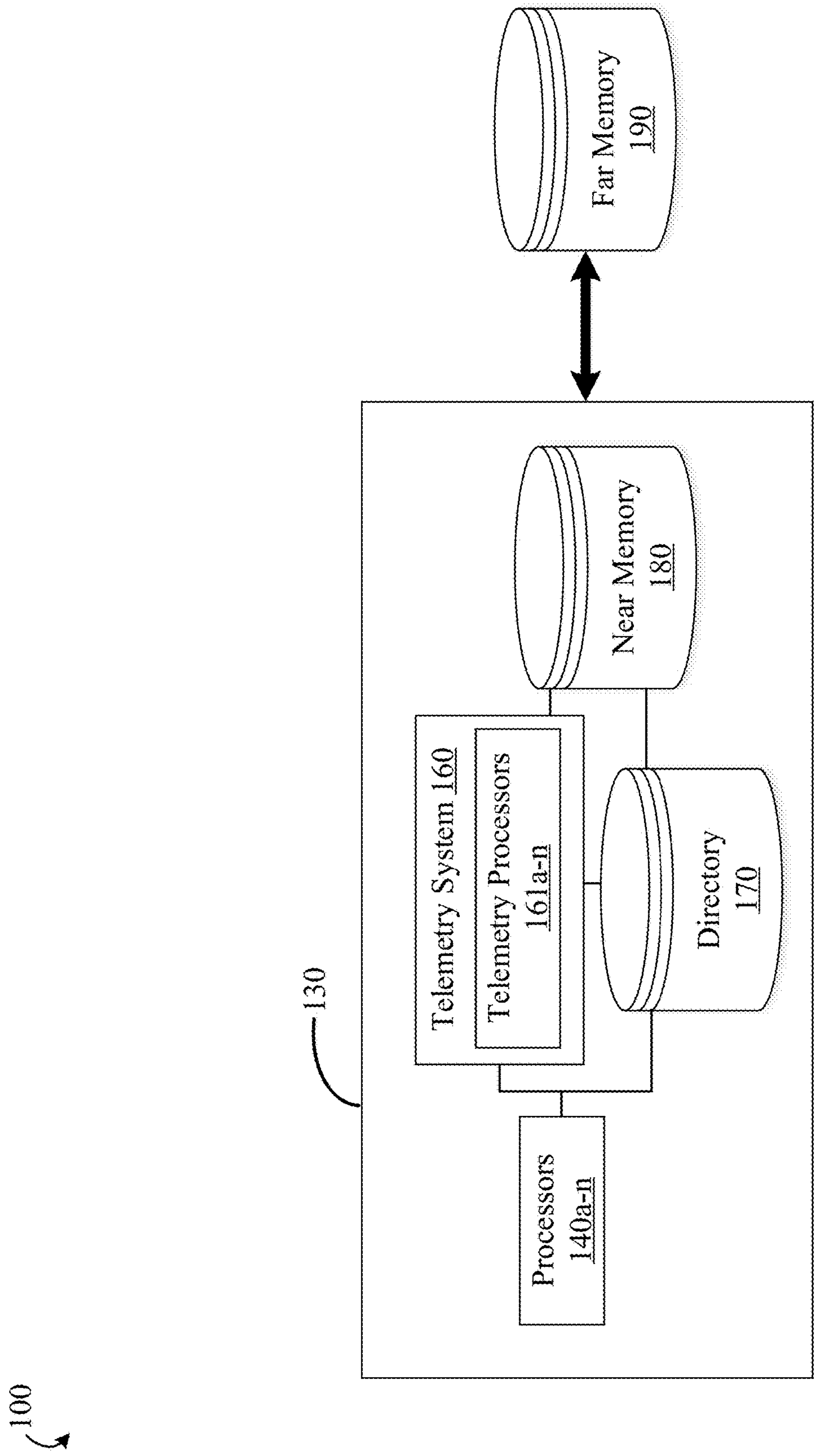
FIGS. 1A and 1B illustrate example systems for using far memory telemetry for hot and cold page management, in accordance with aspects of the disclosure.

The technology described herein is directed to far memory telemetry for hot and cold page management. Data stored on the memory devices can be divided into pages to perform page swapping, which may alleviate latency issues during read/write operations. Frequently accessed pages, typically referred to as hot pages, are moved to local memory on (or near) a system on a chip (SoC). Such local memory is typically referred to as "cache memory" or "near memory." Pages that are not accessed frequently, typically referred to as cold pages, are stored on a memory device that is located in memory off of the SoC. Such memory located off of the SoC is typically referred to as "far memory." Over time, cold pages may become hot pages and vice-versa. Processors may periodically identify the pages in far memory that are accessed the most and move the most accessed pages—the hottest pages—to near memory. In doing so, colder pages, pages that are less hot than the pages being moved onto the near memory, may need to be removed from the near memory to make room for the "hotter" pages. However, periodically analyzing the pages in the far memory is inefficient and might not account for transitions from cold to hot pages.

One or more central processing unit (CPU) cores execute read/write transactions on one or more memory devices associated with the SoC. The SoC receives, from a CPU core, one or more requests to access pages stored in one of a far memory or a near memory. The SoC uses a telemetry system that employs telemetry logic to track pages in the near and far memory. The telemetry system further generates one or more data structures storing data associated with pages in the near memory and/or the far memory. Telemetry processors within the telemetry system parses a page access request transmitted from a CPU core to the SoC. Based on parsing the page access request, the telemetry processors identify a memory address associated with the requested page. In some instances, the telemetry processors determine the size of the requested page based on parsing the page access request. The telemetry processors may use the memory address and the page size to reduce the memory address to a subset of bits used to identify the requested page in a directory.

One or more telemetry processors may use the subset of bits to query the directory to determine whether the directory contains a record for the requested page. The directory can display data in different configurations, including at least a table, a bitmap, and a list. In each directory configuration, the SoC reads the directory data to determine whether to move one or more pages currently stored in the far memory to the near memory. In some instances, the SoC reads the directory data to determine whether to move one or more pages currently stored in the near memory to the far memory.

The telemetry processors, after determining the directory does not store a record for the requested page and after determining the directory is not at capacity, may generate a record and store the record in the directory. The telemetry processors, after determining the directory does not store a record for the requested page and after determining the directory is at capacity, may discard the page access request.

In the event one or more telemetry processors determine the directory stores a record for the requested page, the telemetry processors may increment an access count associated with the requested page. The telemetry processors may transmit a signal to at least one processor of the SoC to determine whether to perform one or more actions on the pages identified in the directory.

FIG. 1A illustrates an example system for using far memory telemetry for hot and cold page management. System 100 includes SoC 130 and far memory 190. SoC 130 includes processors 140*a-n*, telemetry system 160, directory 170, and near memory 180. Telemetry system 160 includes telemetry processors 161*a-n* (referred to herein generally as telemetry processor 161). Each of telemetry processors 161*a-n* may be configured to perform the functionality of telemetry processor 161 described herein. Further, processors 140*a-n* are referred to herein generally as processor 140. SoC 130 receives and processes requests to access pages in either one of near memory 180 or far memory 190.

Hot and cold page management is executed using one or more processors within a computing device, such as processor 140 and telemetry processor 161 within SoC 130. Processor 140 provides requests to perform read/write transactions on memory addresses located in one of the near memory or the far memory. Telemetry processor 161 analyzes each page access request to populate directory 170, which processor 140 may use to manage the pages in near and far memory.

SoC 130 may be communicatively coupled to one or more storage devices over a network. The storage devices may be a combination of volatile and non-volatile memory and may be at the same or different physical locations than the computing devices. For example, the storage devices may include any type of non-transitory computer readable medium capable of storing information, such as a hard-drive, solid state drive, tape drive, optical storage, memory card, ROM, RAM, DVD, CD-ROM, write-capable, and read-only memories.

While not shown in FIG. 1, SoC 130 may include additional memory storing data that may be accessed by processor 140 and/or telemetry processor 161. The additional memory may store, for example, instructions to be executed by at least one of processor 140 and/or telemetry processor 161. The additional memory may also include cache line data that may be read, retrieved, manipulated, or stored by at least one of processor 140 and/or telemetry processor 161. The additional memory may be a type of non-transitory computer readable medium capable of storing information accessible by at least one of processor 140 and/or telemetry processor 161, such as volatile and non-volatile memory. Processor 140 and/or telemetry processor 161 may include one or more central processing units (CPUs), graphic processing units (GPUs), field-programmable gate arrays (FPGAs), and/or application-specific integrated circuits (ASICs), such as tensor processing units (TPUs).

The instructions stored in the additional memory may include one or more instructions that, when executed by at least one of processor 140 and/or telemetry processor 161, cause at least one of processor 140 and/or telemetry processor 161 to perform actions defined by the instructions. The instructions may be stored in object code format for direct processing by the processors, or in other formats including interpretable scripts or collections of independent source code modules that are interpreted on demand or compiled in advance. The instructions may include instructions for generating page access requests, generating read/write transactions on memory addresses in either one of the near memory or the far memory, analyzing page access requests, or the like.

The data stored in the additional memory may be read, retrieved, stored, or modified by at least one of processor 140 and/or telemetry processor 161 in accordance with the instructions. The data may be stored in computer registers, in a relational or non-relational database as a table having a plurality of different fields and records, or as JSON, YAML, proto, or XML documents. The data may also be formatted in a computer-readable format such as, but not limited to, binary values, ASCII, or Unicode. Moreover, the data may include information sufficient to identify relevant information, such as numbers, descriptive text, proprietary codes, pointers, references to data stored in other memories, including other network locations, or information used by a function to calculate relevant data.

Some of the instructions and the data can be stored on a removable SD card and others within a read-only computer chip. Some or all of the instructions and data can be stored in a location physically remote from, yet still accessible by, at least processor 140 and telemetry processor 161.

SoC 130 may further include user input mechanisms, including any appropriate mechanism or technique for receiving input, such as keyboard, mouse, mechanical actuators, soft actuators, touchscreens, microphones, and sensors. In some instances, the user input mechanisms may be used to generate page access requests and/or to initiate and execute read/write transactions on memory pages.

SoC 130 may include user output mechanisms for detecting whether a page access request can be completed, whether a read/write transaction can be completed, or the like.

SoC 130 and far memory 190 are capable of direct and indirect communication over a network. The network itself may include various configurations and protocols including the Internet, World Wide Web, intranets, virtual private networks, wide area networks, local networks, and private networks using communication protocols proprietary to one or more companies. The network may support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network may, in addition or alternatively, also support wired connections between SoC 130 and far memory 190, including over various types of Ethernet connection.

Components of SoC 130 are discussed in further detail in connection with FIGS. 2-4. Although FIG. 1A illustrates telemetry system 160 being positioned within SoC 130, the telemetry system may be positioned outside of the SoC 130 and/or within far memory 190.

Figure 1B:
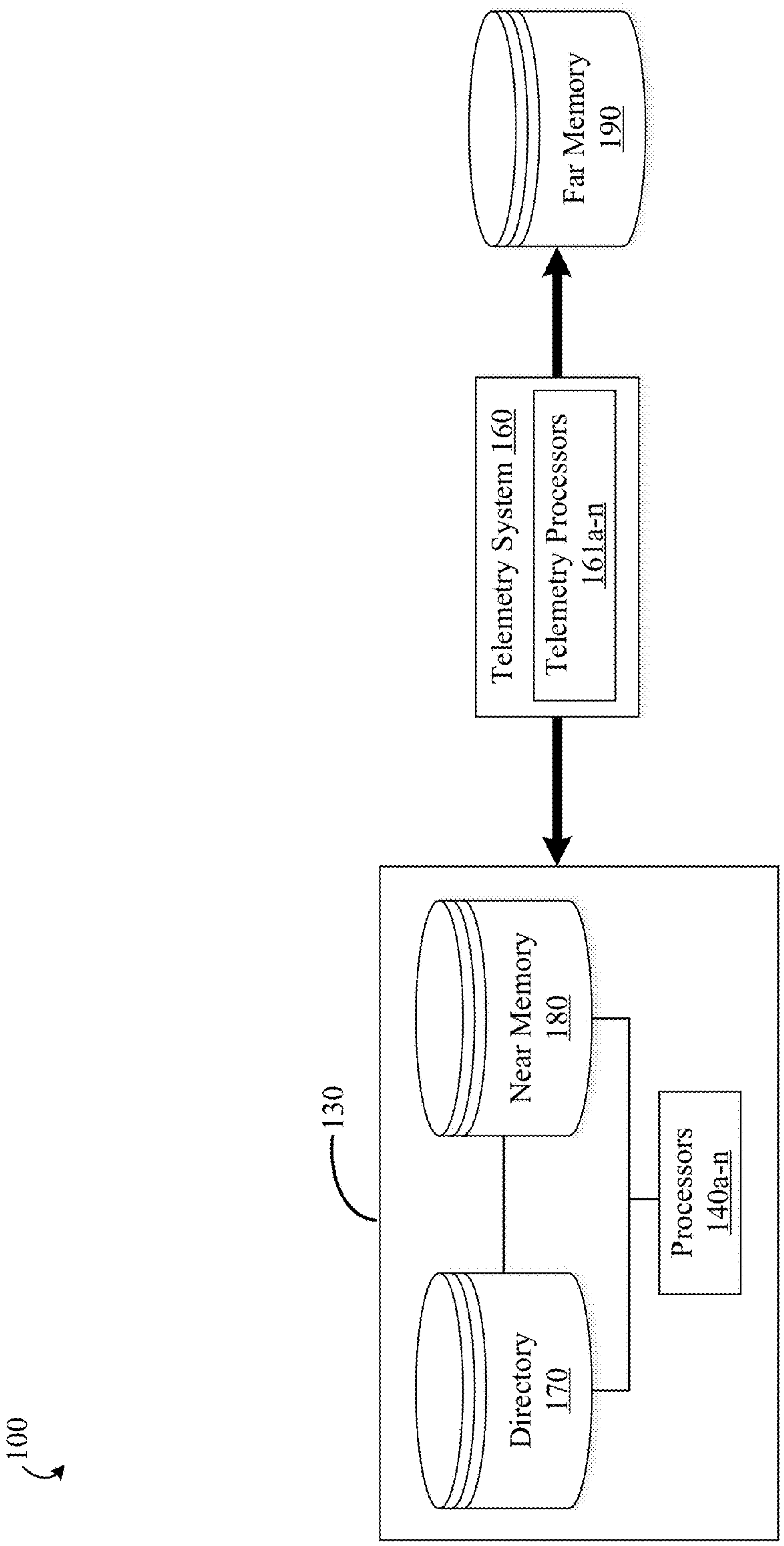

FIG. 1B illustrates an example system for using far memory telemetry for hot and cold page management. As shown in FIG. 1B, telemetry system 160 can be positioned outside of SoC 130. As such, telemetry system 160 might not be configured to receive and analyze page access requests on near memory 180. Telemetry system 160 may be configured to receive and analyze page access requests to far memory 190. Telemetry system 160 may monitor access counts associated with cold pages in far memory 190 to determine whether the cold pages are becoming hot pages. In such instances, directory 170 is not polluted with records indicating requests to access pages in near memory 180, which may be requested with greater frequency than pages in far memory 190. Processor 140 may be configured to determine whether hot pages in near memory 180 are becoming cold pages.

Telemetry processor 161 may monitor page access requests. Based on the page access requests, the telemetry processor 161 may generate one or more different data structures storing data that is used to manage pages. In this regard, telemetry processor 161 may monitor page access requests by reading page access requests generated by processor 140. Telemetry processor 161 may parse page access requests to determine, for instance, a memory address of the requested page and a size of the requested page. In this regard, each page may have a corresponding page size, such as 4 KB, 8 KB, 32 KB, etc.

Telemetry processor 161 may use the determined memory address and the size of the requested page to generate a subset of bits that can be used to identify the requested page. In this regard, telemetry processor 161 may use the page size to determine upper bits and lower bits of the memory address of the requested page. The lower bits of the memory address may be offset bits that might not be used independently to identify the requested page. These lower bits may be removed from the memory address by telemetry processor 161. Telemetry processor 161 may use the remaining bits (e.g, the upper bits) as the subset of bits that identify the requested page. The number of bits that comprise the upper bits is based on the page size.

The subset of bits that identify the requested page may be used to query directory 170. For example, telemetry processor 161 may query directory 170 to determine whether directory 170 contains a record of the requested page. Directory 170 stores data associated with the pages in far memory 190 and, in some instances, data associated with the pages in near memory 180. The data in directory 170 may include at least memory addresses for the pages stored in far memory 190, a number of times each page in far memory 190 is accessed, and/or a capacity of near memory 180. Directory 170 may be configured to operate as a cache. As such, directory 170 might not store the data within each memory address that corresponds to a requested page. As discussed in detail below, directory 170 stores information that can be used to identify the requested pages, such as the memory addresses and subsets of bits derived from the memory addresses.

Directory 170 stores and provides data in different configurations. In some instances, directory 170 stores data using a table. FIG. 2 illustrates an example directory storing a table used for far memory telemetry for hot and cold page management. Directory 170 may be implemented as a direct map cache, a set-associative cache, or the like.

The data stored within the table includes a plurality of records, such as records 1 to N shown in FIG. 2. A record corresponds to at least one page and includes at least a memory address that corresponds to the page, a subset of bits of the memory address that can be used to identify the page, a page size, and a number of times a request to access the page was received (referred to herein as an access count). The page size may be indicated in the page access request. The number of records that can be stored in the directory is based at least on the capacity of the directory. As shown in FIG. 2, the capacity of the example directory is N and, as such, the example directory can store N number of records. As discussed in detail below, processor 140 reads the data in directory 170 to determine whether to perform particular actions, such as move pages from far memory 190 to near memory 180.

In some instances, the data in directory 170 can be used to generate a bitmap. FIG. 3 illustrates an example directory implemented as a bitmap used for far memory telemetry for hot and cold page management. The number of bits that can be represented on the bitmap is based at least on the capacity of directory 170. Each bit (or each group of bits) on the bitmap represents a page. In particular, each bit (or group of bits) corresponds to a memory address of the page, a subset of bits that can be used to identify the page, an access count of the page, and an access threshold. The access threshold indicates a number of access requests that signals the transition from a cold page to a hot page (e.g., a number of access requests needed to move the page from far memory 190 to near memory 180). The access threshold can be updated dynamically based on, for example, application-specific requirements.

The state of a bit may indicate whether the access count of the page associated with the bit meets or exceeds the access threshold of the page associated with the bit. For example, a bit state of "0" may indicate that the access count of the associated page does not meet or exceed the access threshold. A bit state of "1" may indicate that the access count of the associated page meets or exceeds the access threshold. As discussed in detail below, processor 140 uses the bitmap to identify the pages that meet or exceed access thresholds. In particular, processor 140 parses the bitmap for bits in a particular state to identify pages that meet or exceed the associated access thresholds. Further, processor 140 may move the identified pages from far memory 190 to near memory 180.

In some instances, that data in directory 170 can be used to generate a list. FIG. 4 illustrates an example directory implemented as a list used for far memory telemetry for hot and cold page management. The list identifies the pages with the most number of access requests compared to each page for which an access request is received. The data stored on the list includes at least a subset of bits that are used to identify the page and an access count. In some instances, the list further includes the memory address of the page.

As discussed in detail below, processor 140 uses the list to identify the pages with the most number of access requests. Processor 140 determines whether to move the pages on the list from far memory 190 to near memory 180. When directory 170 is configured as a list, processor 140 might not analyze data associated with each page to identify pages in far memory 190 that should be moved to near memory 180.

Returning to the discussion of FIG. 1, based on processor 140 generating a page access request, telemetry processor may 161 query directory 170 using at least the subset of bits that identify the requested page. In any configuration of directory 170, the outcome of the query indicates that directory 170 either stores a record associated with the requested page or does not store a record associated with the requested page.

Based on determining directory 170 contains a record associated with the requested page, telemetry processor 161 locates the record and increments (e.g., by 1) the access count of the requested page. However, based on determining directory 170 might not contain a record associated with the requested page, telemetry processor 161 determines whether directory 170 is at capacity. In any configuration of directory 170, telemetry processor 161 parses directory 170 to determine a directory capacity. The directory capacity indicates a maximum amount of data that can be stored in directory 170. For example, when directory 170 stores directory data using a table, as shown in FIG. 2, the directory capacity may indicate a maximum number of records that directory 170 can store. When directory 170 stores directory data using a bitmap, as shown in FIG. 3, the directory capacity may indicate a maximum number of bits on the bitmap. Further, when directory 170 stores directory data using a list, as shown in FIG. 4, the directory capacity may indicate a maximum number of pages that can be listed.

Based on determining a current capacity of directory 170 is less than the directory capacity, telemetry processor 161 generates a record associated with the requested page. Referring to FIG. 2, when directory 170 is configured as a table, the new record indicates at least the memory address of the requested page, the subset of bits that are used to identify the requested page, the page size, and the access count. The current directory capacity is updated to include the new record.

Figure 3:
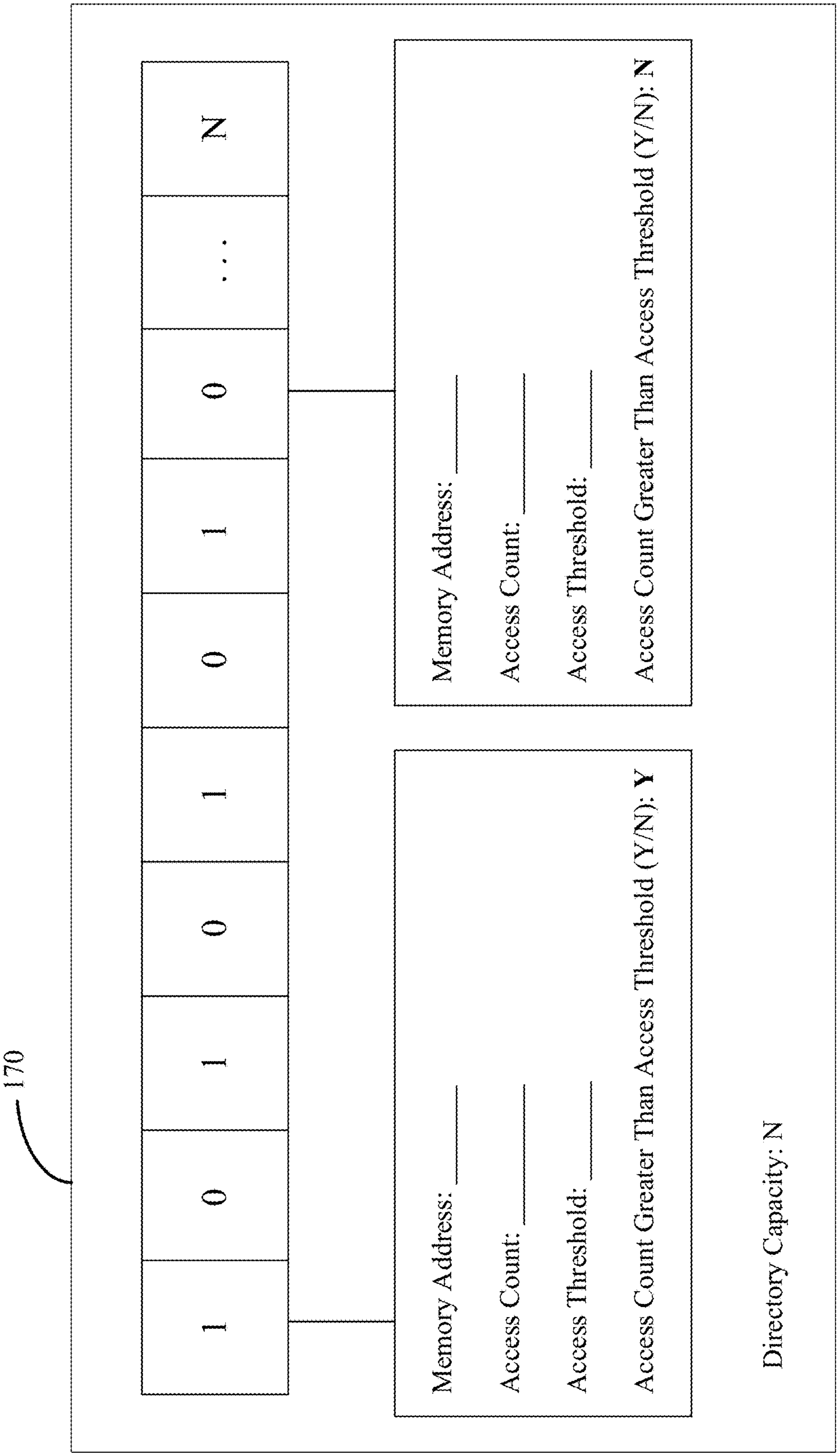
FIG. 3 illustrates an example directory implemented as a bitmap used for far memory telemetry for hot and cold page management, in accordance with aspects of the disclosure.

Referring to FIG. 3, when the data in directory 170 is used to generate a bitmap, one or more bits are added to the bitmap to represent the requested page. The data associated with the one or more new bits include at least the memory address of the requested page, the subset of bits that are used to identify the requested page, the access count of the requested page, an access threshold of the requested page, and an indication of whether the access count meets or exceeds the access threshold. The access threshold may be a pre-determined value and may be updated dynamically based on, for example, application-specific requirements. Telemetry processor 161 may compare the access count to the access threshold to set the state(s) of the one or more new bits. For example, based on determining the access count is less than the access threshold, telemetry processor 161 may set the state(s) of the one or more new bits to "0". Based on determining if the access count meets or exceeds the access threshold, telemetry processor 161 may set the state(s) of the one or more new bits to "1". The current directory capacity is updated to include the one or more new bits.

Figure 4:
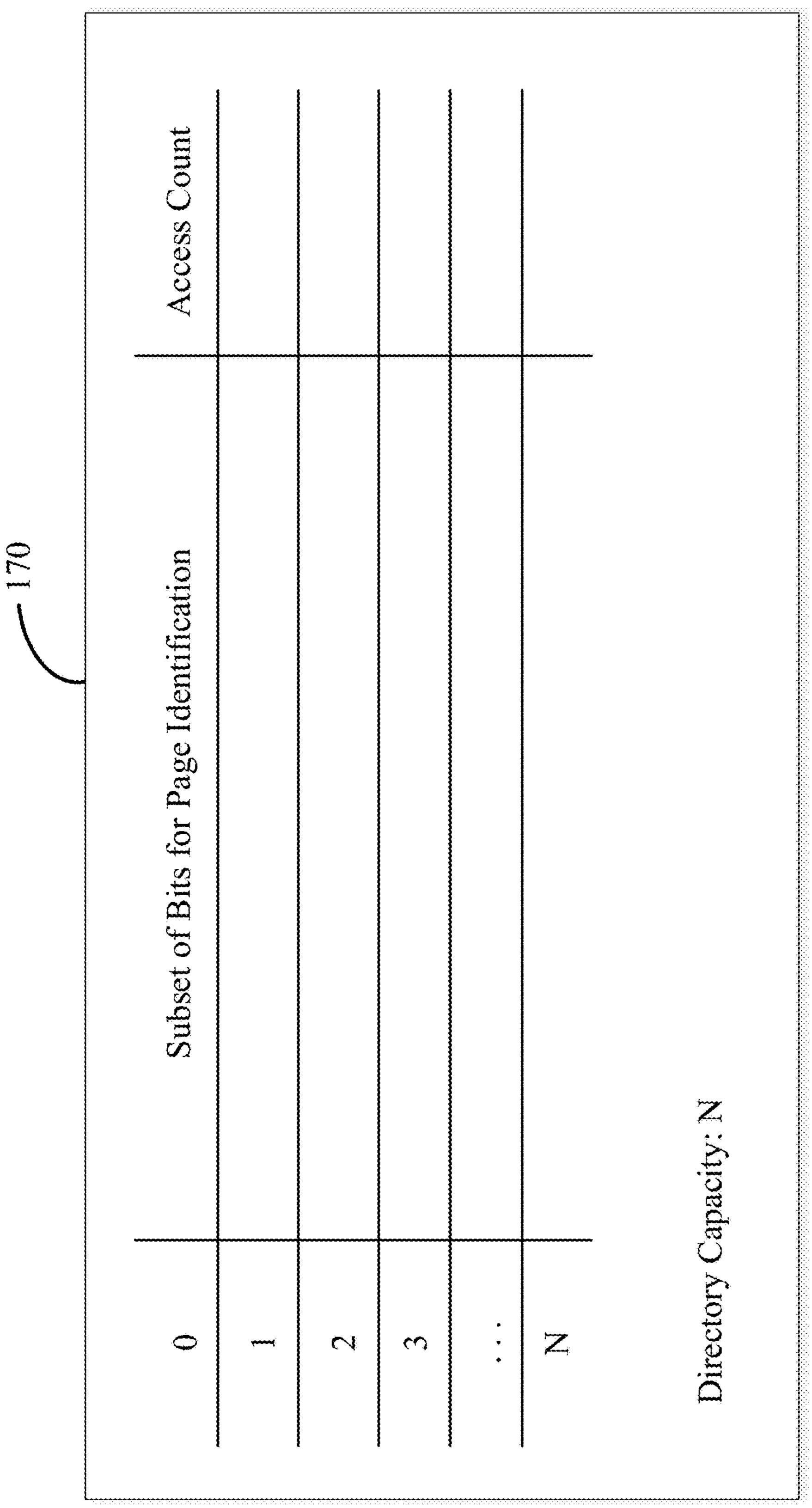
FIG. 4 illustrates an example directory implemented as a list used for far memory telemetry for hot and cold page management, in accordance with aspects of the disclosure.

Referring to FIG. 4, when the data in directory 170 is used to generate a list, the requested page is added to the list if the access count associated with the requested page is greater than at least one page that is currently on the list. The list identifies the pages in far memory 190 for which the most access requests are received. Telemetry processor 161 compares the access count of the requested page to the access counts of the pages on the list. If the access count of the requested page is equal to or less than the access counts of the pages that are currently on the list, then telemetry processor 161 might not record the requested page on the list. However, if the access count of the requested page is greater than at least one access count of a page that is currently on the list, then telemetry processor 161 adds to the list the subset of bits that are used to identify the requested page and the access count of the requested page. Telemetry processor 161 updates the current directory capacity to include the requested page that is added to the list.

In some instances, telemetry processor 161 compares the current capacity of directory 170 to the directory capacity to determine whether to replace one or more entries in directory 170 with the same access count.

Returning to the discussion of FIG. 1, in some instances, telemetry processor 161 determines that directory 170 might not store a record associated with the requested page. Further, telemetry processor 161 determines the current capacity of directory 170 meets or exceeds the directory capacity. Telemetry processor 161 discards the page access request such that the page access request might not be logged in directory 170. However, processor 140 may be configured to access the requested page.

Telemetry processor 161 transmits a signal to processor 140. In some instances, the signal indicates that directory 170 is updated based on received page access requests. The signal may prompt processor 140 to use the data in directory 170 to determine whether to move pages from far memory 190 to near memory 180. In some instances, processor 140 periodically polls telemetry processor 161 to determine whether directory 170 contains updated page access request information.

Telemetry system 160 provides an interface with which both telemetry system 160 (and components thereof) and SoC 130 can interact. In particular, SoC 130 (and components thereof) access directory 170 via the interface.

Processor 140 uses the data in directory 170 to determine a status of a page that is recorded in directory 170. The status of a page is based on at least an access count associated with the page (e.g., a number of read or write transactions executed on the memory address(es) associated with the page). Pages that are frequently accessed are referred to herein as hot pages. The frequency with which a page should be accessed to identify as a hot page is based on the access threshold associated with the page. The access threshold is a pre-determined value and can be updated dynamically based on application-specific changes and/or requirements. Pages for which the access count meets or exceeds the access threshold are considered hot pages. Pages that are not accessed frequently are referred to herein as cold pages. Pages for which the access count neither meets nor exceeds the access threshold are considered cold pages.

Using the data in directory 170, processor 140 determines whether a page is a hot page, a cold page, or a cold page that is transitioning to a hot page. Processor 140 compares the access count of a page to an access threshold of the page. The access threshold of the page might not be stored in directory 170. Processor 140 may receive instructions indicating the access threshold(s) for the pages in far memory 190. Processor 140 analyzes each page on the table to using the received access threshold. For each page, processor 140 determines whether the access count of a page meets or exceeds the associated access threshold.

Based on determining at least one page is either a hot page stored in far memory 190 or is a cold page in far memory 190 that is transitioning to a hot page, processor 140 may move the page from far memory 190 to near memory 180. Doing so may reduce latency interruptions when executing read/write transactions on the memory address of the page in far memory 190. Moving the page from far memory 190 to near memory 180 changes the memory address associated with the page. Therefore, processor 140 updates the table in directory 170 to reflect an updated memory address for the page. However, based on determining the page is a cold page in far memory 190, processor 140 might not move the page to near memory 180.

In some instances, processor 140 uses the capacity of near memory 180 to determine whether pages from far memory 190 can be moved to near memory 180. Processor 140 may compare a current capacity of near memory 180 to the capacity of near memory 180 to determine whether near memory 180 can store additional pages. In some instances, processor 140 uses the data in directory 170 to remove pages from near memory 180 such that pages from far memory 190 can be added to near memory 180.

When the data in directory 170 is used to generate a bitmap, as shown in FIG. 3, processor 140 parses the bitmap to identify the bits that are set to a state that indicates an access count meets or exceeds an associated access threshold (e.g., bits that set to "1"). Bits that are set to a "0" state may be cold pages. Bits that are set to a "1" state may be hot pages. Processor 140 uses the bitmap to identify the hot pages and may move the hot pages from far memory 190 to near memory 180. Processor 140 updates the bitmap in directory 170 to reflect an updated memory address for the moved pages. In some instances, processor 140 determines that none of the pages represented on the bitmap are hot pages and might not move any pages to near memory 180.

When the data in directory 170 is used to generate a list, as shown in FIG. 4, processor 140 parses the list to identify the listed pages. Processor 140 may move the listed pages from far memory 190 to near memory 180. Processor 140 updates directory 170 to reflect an updated memory address for the moved pages.

Processor 140 may clear directory 170. In some instances, directory 170 is cleared after processor 140 analyzes the data in directory 170 and/or determines whether to move pages between memory devices. In some instances, directory 170 is cleared at predetermined time intervals that can be dynamically updated based on, at least, application-specific changes and/or requirements.

In some instances, directory 170 may also store data associated with pages in near memory 180. For each page in near memory 180, the data indicates at least a memory address, a subset of bits that is used to identify the page, an access count, and an access threshold. Processor 140 parses the data associated with the pages in near memory 180 to determine whether to move one or more pages to far memory 190. A page in near memory 180 may be moved to far memory 190 when the access count no longer meets or exceeds the access threshold. In particular, cold pages are moved from near memory 180 to far memory 190.

Figure 5:
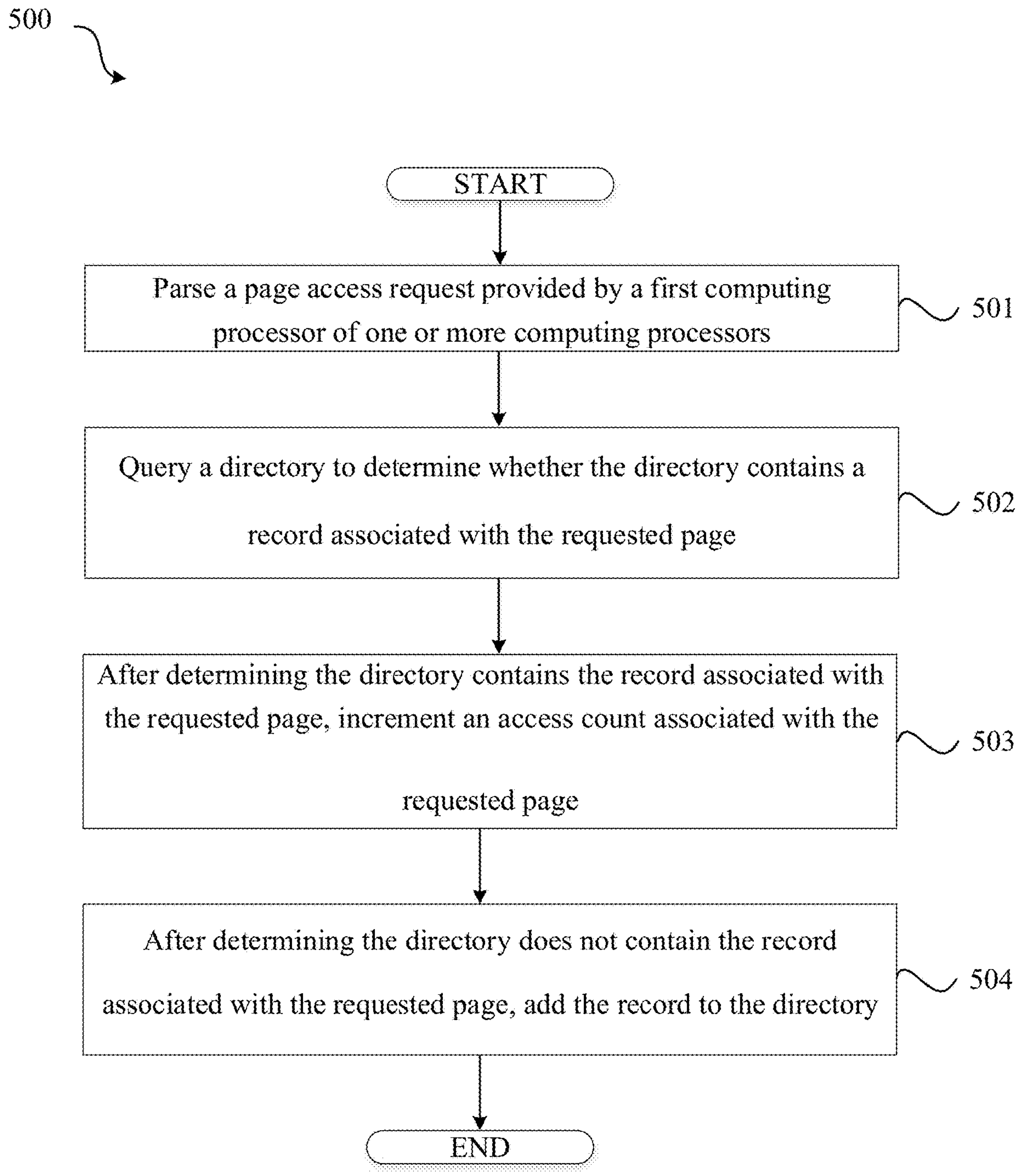
FIG. 5 illustrates a flow diagram for an example method of using far memory telemetry for hot and cold page management, in accordance with aspects of the disclosure.

FIG. 5 illustrates a flow diagram for an example method of using far memory telemetry for hot and cold page management. The operations described herein are presented in the current order by way of example, and the order is not meant to be limiting. Moreover, operations may be omitted from or added to the example method. Furthermore, while the example method describes the analysis and processing of a single page access request, multiple page access requests can be processed in parallel.

At block 501, telemetry processor 161 parses a page access request provided by a first computing processor of the one or more computing processors, such as processor 140*a* of processors 140*a-n*. Based on parsing the request, telemetry processor 161 determines at least a memory address of the requested page and a size of the requested page. Telemetry processor 161 may reduce the memory address to a subset of bits of the memory address that are used to identify the requested page.

At block 502, telemetry processor 161 queries a directory to determine whether the directory contains a record associated with the requested page. Telemetry processor 161 queries directory 170 using at least the subset of bits that are used to identify the requested page. The outcome of the query indicates that directory 170 either stores a record of the requested page or might not store a record of the requested page.

At block 503, based on determining the directory contains the record associated with the requested page, telemetry processor 161 increments an access count associated with the requested page. Telemetry processor 161 may transmit a signal to processor 140 indicating that the access count associated with the requested page has been incremented. In some instances, telemetry processor 161 determines, based on querying directory 170, that directory 170 does not store the record of the requested page. Telemetry processor 161 compares a current capacity of directory 170 to the directory capacity to determine whether directory 170 can store additional data. Based on determining directory 170 is at capacity, telemetry processor 161 discards the page access request.

However, at block 504, based on determining directory 170 is not at capacity, telemetry processor 161 generates a record for the requested page and adds the record to directory 170. The record indicates at least a memory address of the page, the subset of bits that are used to identify the page, and an access count indicating a number of times a request to perform a read/write transaction on the page is received. Telemetry processor 161 may transmit a signal to processor 140 indicating that the record associated with the requested page has been added to directory 170.

It is understood that the aspects of the disclosure may be implemented according to a variety of different configurations and quantities of computing devices, including in paradigms for sequential or parallel processing, or over a distributed network of multiple devices.

The foregoing aspects of this technology offer far memory telemetry for hot and cold page management to reduce the latency associated with executing read/write transactions on pages stored in a far memory device. An SoC uses a first plurality of processors to continuously monitor pages stored in the far memory device using telemetry logic. The first plurality of processors monitor a number of times each page is requested and compares the request frequency to a number of access requests needed to flag the page as a hot page. The first plurality of processors uses different data structures to flag hot pages stored in the far memory device and, in some instances, cold pages stored in a memory device on the SoC (a near memory device). The SoC uses a second plurality of processors to move hot pages in the far memory device to the near memory device. Further, the SoC uses the second plurality of processors to move cold pages in the near memory device to the far memory device.

Aspects of this disclosure can be implemented in digital electronic circuitry, in tangibly-embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" refers to data processing hardware and encompasses various apparatus, devices, and machines for processing data, including programmable processors, a computer, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The data processing apparatus can include special-purpose hardware accelerator units for implementing machine learning models to process common and compute-intensive parts of machine learning training or production, such as inference or workloads. Machine learning models can be implemented and deployed using one or more machine learning frameworks.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process programmed to perform one or more specific functions. The engine can be implemented as one or more software modules or components, or can be installed on one or more computers in one or more locations. A particular engine can have one or more computers dedicated thereto, or multiple engines can be installed and running on the same computer or computers.

The processes and logic flows described herein can be performed by one or more computers or special purpose logic circuitry, such as a system on chip (SoC) executing one or more computer programs to perform functions by operating on input data and generating output data. The processes and logic flows can also be performed by special purpose logic circuitry, or by a combination of special purpose logic circuitry and one or more computers.

A computer or special purposes logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back-end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the implementations should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for managing pages in memory, the system comprising:

one or more computing processors having near memory;

far memory coupled to the one or more computing processors; and one or more telemetry processors, wherein the one or more telemetry processors are configured to:

receive a page access request from the one or more computing processors;

parse the page access request by:

identifying a memory address associated with the requested page;

identifying a page size of the requested page;

determining a number of upper bits and lower bits of the memory address based on the page size;

reducing the memory address into the upper bits and lower bits, wherein the lower bits are offset bits; and removing the offset bits from the memory address to generate a subset of bits that identify the requested page;

query a directory using the subset of bits to determine that the directory contains a record associated with the requested page, the directory comprising a bitmap having a maximum number of bits corresponding to a capacity of the directory, the capacity of the directory corresponding to a capacity of records of pages capable of being maintained by the directory, wherein each bit or group of bits of the bitmap corresponds to different pages stored in the far memory, access counts for the different pages, and an access threshold indicating to transition a page from the far memory to the near memory; and in response to determining that the directory contains the record associated with the requested page, increment an access count associated with the requested page.

2. The system of claim 1, wherein the one or more telemetry processors are further configured to transmit a signal to the one or more computing processors indicating the access count associated with the requested page has been incremented.

3. The system of claim 1, wherein the directory further comprises a table comprising the subset of bits and the page size of the requested page.

4. The system of claim 1, wherein the access count indicates a number of times a request to access the requested page is parsed.

5. The system of claim 1, wherein a state of each bit or group of bits of the bitmap indicates whether the access count for that page exceeds the access threshold.

6. The system of claim 1, wherein the directory further comprises a list.

7. The system of claim 6, wherein the list comprises one or more most requested pages stored in the far memory.

8. The system of claim 6, wherein a number of pages in the list is based on the capacity of the directory.

9. The system of claim 1, wherein the one or more computing processors are configured to:

identify pages in the directory for which the access count exceeds the access threshold; and move the identified pages from the far memory to the near memory.

10. The system of claim 1, wherein the one or more telemetry processors are further configured to:

receive a second page access request from the one or more computing processors;

parse the second page access request; and query the directory to determine that the directory does not contain a record associated with the second requested page.

11. The system of claim 10, wherein the one or more telemetry processors are further configured to, in response to determining that the directory does not contain the record associated with the second requested page, add the record associated with the second requested page to the directory.

12. The system of claim 11, wherein the one or more telemetry processors are further configured to transmit a signal to the one or more computing processors indicating the record associated with the second requested page has been added to the directory.

13. The system of claim 11, wherein the one or more telemetry processors are further configured to add the record associated with the second requested page to the directory based on determining the directory is not at capacity.

14. The system of claim 10, wherein the one or more telemetry processors are further configured to, in response to determining that the directory does not contain the record associated with the second requested page, discard the second page access request.

15. The system of claim 14, wherein the one or more telemetry processors are further configured to discard the second page access request based on determining the directory is at capacity.

16. A method for managing pages in memory comprising:

receiving, by one or more telemetry processors, a page access request from the one or more computing processors, the one or more computing processors having near memory and being coupled to far memory;

parsing, by the one or more telemetry processors, the page access request by:

identifying a memory address associated with the requested page;

identifying a page size of the requested page;

determining a number of upper bits and lower bits of the memory address based on the page size;

reducing the memory address into the upper bits and lower bits, wherein the lower bits are offset bits; and removing the offset bits from the memory address to generate a subset of bits that identify the requested page;

querying, by the one or more telemetry processors, a directory using the subset of bits to determine that the directory contains a record associated with the requested page, the directory comprising a bitmap having a maximum number of bits corresponding to a capacity of the directory, the capacity of the directory corresponding to a capacity of records of pages capable of being maintained by the directory, wherein each bit or group of bits of the bitmap corresponds to different pages stored in the far memory, access counts for the different pages, and an access threshold indicating to transition a page from the far memory to the near memory; and in response to determining that the directory contains the record associated with the requested page, incrementing, by the one or more telemetry processors, an access count associated with the requested page.

17. A non-transitory computer readable medium storing instructions that, when executed by one or more telemetry processors, cause the one or more telemetry processors to perform a method for managing pages in memory, the method comprising:

receiving a page access request from one or more computing processors, the one or more computing processors having near memory and being coupled to far memory;

parsing the page access request by:

identifying a memory address associated with the requested page;

identifying a page size of the requested page;

determining a number of upper bits and lower bits of the memory address based on the page size;

reducing the memory address into the upper bits and lower bits, wherein the lower bits are offset bits; and removing the offset bits from the memory address to generate a subset of bits that identify the requested page;

querying a directory using the subset of bits to determine that the directory contains a record associated with the requested page, the directory comprising a bitmap having a maximum number of bits corresponding to a capacity of the directory, the capacity of the directory corresponding to a capacity of records of pages capable of being maintained by the directory, wherein each bit or group of bits of the bitmap corresponds to different pages stored in the far memory, access counts for the different pages, and an access threshold indicating to transition a page from the far memory to the near memory; and in response to determining that the directory contains the record associated with the requested page, incrementing an access count associated with the requested page.

* * * * *